United States Patent
Hotta et al.

(10) Patent No.: US 8,045,428 B2
(45) Date of Patent: Oct. 25, 2011

(54) OPTICAL PICKUP APPARATUS

(75) Inventors: Tohru Hotta, Nagano (JP); Ryoichi Kawasaki, Gunma (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 325 days.

(21) Appl. No.: 12/256,186

(22) Filed: Oct. 22, 2008

(65) Prior Publication Data

US 2009/0129245 A1 May 21, 2009

(30) Foreign Application Priority Data

Oct. 26, 2007 (JP) ................................. 2007-278461

(51) Int. Cl.
*G11B 7/00* (2006.01)
(52) U.S. Cl. .................................................... 369/44.42
(58) Field of Classification Search ............... 369/44.42, 369/44.41, 44.37, 44.23, 112.01, 112.04, 369/112.05, 112.07
See application file for complete search history.

(56) References Cited

U.S. PATENT DOCUMENTS

| | | | | |
|---|---|---|---|---|
| 4,358,200 A | * | 11/1982 | Heemskerk et al. | 369/44.23 |
| 4,709,139 A | * | 11/1987 | Nakamura et al. | 369/44.23 |
| 4,779,255 A | * | 10/1988 | Sugiyama et al. | 369/44.23 |
| 5,420,847 A | * | 5/1995 | Maeda et al. | 369/44.37 |
| 6,222,803 B1 | * | 4/2001 | Uemura et al. | 369/44.41 |
| 2003/0165014 A1 | * | 9/2003 | Fukasawa et al. | 369/109.01 |
| 2005/0226106 A1 | * | 10/2005 | Hwang et al. | 369/44.41 |
| 2006/0209647 A1 | * | 9/2006 | Park et al. | 369/44.41 |
| 2007/0147198 A1 | * | 6/2007 | Nagatomi et al. | 369/44.23 |
| 2007/0237039 A1 | * | 10/2007 | Takeuchi | 369/44.23 |

FOREIGN PATENT DOCUMENTS

JP 8-339556 12/1996

* cited by examiner

*Primary Examiner* — Thang Tran
(74) *Attorney, Agent, or Firm* — Fish & Richardson P.C.

(57) ABSTRACT

An optical pickup apparatus comprising: an objective lens focusing laser light emitted from a laser diode to a signal recording layer of an optical disc; a photodetector including a substantially square light-receiving region made of first to fourth sensors divided by boundaries in a first direction corresponding to a tracking direction and a second direction crossing the first direction, the light-receiving region being irradiated with reflected light of the laser light which is reflected from the signal recording layer thereof; and a half mirror reflecting the laser light in a direction of the objective lens and allowing the reflected light to pass therethrough in a direction of the photodetector, the boundary in the second direction for dividing the first to fourth sensors in the light-receiving region being set according to a shape of a spot of the reflected light directly applied from the half mirror to the light-receiving region.

3 Claims, 4 Drawing Sheets

OPTICAL PICKUP APPARATUS

CROSS-REFERENCE TO RELATED APPLICATION

This application claims the benefit of priority to Japanese Patent Application No. 2007-278461, filed Oct. 26, 2007, of which full contents are incorporated herein by reference.

BACKGROUND OF THE INVENTION

1. Field of the Invention

The present invention relates to an optical pickup apparatus performing a reading operation of a signal recorded in an optical disc or a recording operation of a signal into the optical disc.

2. Description of the Related Art

There have been widespread optical disc devices capable of a signal reading operation and signal recording operation by applying laser light emitted from an optical pickup apparatus to a signal recording layer of the optical disc.

The optical disc devices are widely available in general, which use optical discs called CD (Compact Disc) and DVD (Digital Versatile Disc). As laser light for performing the reading operation of a signal recorded in a CD standard optical disc, infrared light with a wavelength of 780 nm is used, and as laser light for performing the reading operation of a signal recorded in a DVD standard optical disc, red light with a wavelength of 650 nm is used.

Thickness of a protective layer provided on a top face of a signal recording layer of the CD standard optical disc is specified at 1.2 mm, and a numerical aperture of an objective lens used for the reading operation of a signal from this signal recording layer is specified at 0.45. Thickness of a protective layer provided on a top face of a signal recording layer of the DVD standard optical disc is specified at 0.6 mm and a numerical aperture of an objective lens used for the reading operation of a signal from this signal recording layer is specified at 0.6.

FIG. 6 is a schematic diagram illustrating an optical system making up an optical pickup apparatus performing a reproduction operation of a signal recorded in a signal recording layer L provided in an optical disc D in the DVD standard, and a configuration of the optical pickup apparatus will be described with reference to FIG. 6.

In FIG. 6, reference numeral 1 denotes a laser diode emitting a laser beam, which is red light with a wavelength of 650 nm, and reference numeral 2 denotes a diffraction grating that is provided at a position where the laser light emitted from the laser diode 1 enters, and that splits the laser beam to generate a main beam which is 0th order diffracted light and sub beams which are ±1st order diffracted lights. Reference numeral 3 denotes a half-wave plate that the laser light having passed through the diffraction grating 2 enters, and that adjusts a polarization direction of the laser light emitted from the laser diode 1 to an S-direction or P-direction of linear polarization light.

Reference numeral 4 is a half mirror that is provided at a position where the laser light having passed through the diffraction grating 2 and the half-wave plate 3 enters, and that has a control film formed thereon which reflects the laser light in a direction of the optical disc D and which allows return light reflected from the signal recording layer L of the optical disc D to pass therethrough. Reference numeral 5 denotes a collimating lens that is provided at a position where the laser light reflected by the half mirror 4 enters, and that converts the incident laser light into parallel light.

Reference numeral 6 is a raising mirror that the laser light having been converted into the parallel light by the collimating lens 5 is incident, and that reflects the laser light to change an optical axis in a perpendicular direction. Reference numeral 7 is a quarter-wave plate that is provided at a position where the laser light reflected by the raising mirror 6 enters, and that polarizes the laser light incident from the side of the raising mirror 6 from the linear polarization light into circular polarization light and polarizes the return light which is laser light incident from the opposite side, from the circular polarization light into the linear polarization light.

Reference numeral 8 is an objective lens that is provided at a position where the laser light having passed through the quarter-wave plate 7 is applied, and that generates a spot in a shape suitable for the reproduction operation performed by focusing the laser light on the signal recording layer L provided in the optical disc D. The laser light focused on the signal recording layer L provided in the optical disc D by the objective lens 8 is reflected by the signal recording layer L to enter the objective lens 8 from the side of the optical disc D as return light.

The return light entering the objective lens 8 passes through the objective lens 8, and then enters the quarter-wave plate 7 to be converted by the quarter-wave plate 7 from the circular polarization light into the linear polarization light. The return light having been polarized as above is reflected by the raising mirror 6, and then enters the collimating lens 5.

The return light entering the collimating lens 5 passes through the collimating lens 5 to enter the half mirror 4. The laser light and the return light are reversed with each other in a polarization direction of the linear polarization light by a reciprocal transmission operation, which is an operation that the laser light passes through the quarter-wave plate 7 onward and the return light passes therethrough backward, and therefore, the return light entering the half mirror 4 as above is not reflected by the control film provided for the half mirror 4 but passes through the control film.

The half mirror 4 adds astigmatism to the return light passing therethrough in order to generate a focus error signal for a focusing control operation, however, it has a problem that coma aberration is generated due to its characteristics. Reference numeral 9 denotes an AS (Astigmatism) plate that provided at a position where the return light having passed through the half mirror 4 enters, and that is made up so as to enlarge the astigmatism generated in the half mirror 4 to become in a size suitable for generating a focus error signal and so as to correct the coma aberration generated in the half mirror 4.

Reference numeral 10 is a photodetector that is provided at a position where the return light having passed through the AS plate 9 is applied and that is made up so as to generate a focus error signal and a tracking error signal by using a change in spot shape formed by irradiation.

The optical system of the optical pickup apparatus to be used in general is configured as described above, and a generation operation of the tracking error signal will be described below referring to FIG. 2.

For a light receiving portion of the photodetector 10, there are provided a four-divided sensor portion 10a to which a main beam M in the return light is applied as shown in FIG. 2 and two-divided sensor portions 10b and 10c to which sub beams S1 and S2 are applied, respectively, are provided. The four-divided sensor portion 10a is made up of sensors A, B, C, and D as shown in the figure, while the two-divided sensor portions 10b and 10c are made up of sensors E, F and sensors G, H, respectively.

In such configuration, if a spot position of the laser light with respect to a signal track provided for the optical disc D is displaced in a radial direction of the optical disc D, that is, if tracking deviation occurs, a position of the main beam M formed on the four-divided sensor portion 10a by irradiation and positions of the sub beams S1 and S2 formed on the two-divided sensor portions 10b, 10c by irradiation, are displaced in a direction of an arrow A or B. As a result of this, an amount of light received by each of the sensors is changed.

A circuit diagram illustrated in FIG. 2 is for a tracking control operation called differential push-pull method. In FIG. 2, reference numeral 11 is a first adder for adding a signal obtained from the sensor A irradiated with the main beam M to a signal obtained from the sensor D irradiated therewith, reference numeral 12 is a second adder for adding a signal obtained from the sensor B irradiated therewith to a signal obtained from the sensor C irradiated therewith, reference numeral 13 denotes a first subtracter for subtracting an output signal obtained from the second adder 12 from an output signal of the first adder 11, reference numeral 14 denotes a second subtracter for subtracting a signal obtained from the sensor F irradiated with the sub beam S1 from a signal obtained from the sensor E irradiated therewith, and reference numeral 15 denotes a third subtracter for subtracting a signal obtained from the sensor H irradiated with the sub beam S2 from a signal obtained from the sensor G irradiated therewith.

Reference numeral 16 denotes a third adder for adding an output signal of the second subtracter 14 to an output signal of the third subtracter 15, reference numeral 17 denotes an amplification circuit for amplifying an output signal of the third adder 16 by K times (K is set based on a light amount ratio between a light amount of the main beam and a light amount of the sub beams) to be output, reference numeral 18 denotes a fourth subtracter for subtracting an output signal of the amplification circuit 17 from an output signal of the first subtracter 13, and its output signal is output to an output terminal 19 as a tracking error signal.

Supposing that signals obtained from each of the sensors A, B, C, D, E, F, G, and H are A, B, C, D, E, F, G, and H and the tracking error signal is TE, the tracking error signal TE is calculated by $TE=(A+D)-(B+C)-K\{(E-F)+(G-H)\}$, and such tracking error signal TE can be obtained from a circuit shown in FIG. 2. An art relating to an optical pickup apparatus performing the tracking control operation by such differential push-pull method is described in Japanese Laid-Open Patent Publication No. H08-339556.

a, b, and c of FIG. 5 show states where the main beam M in the return light is applied to the four-divided sensor portion 10a, in which the a and c show states where the spot position of the laser light is deviated with respect to the signal track, and the b shows a state where the spot of the laser light is positioned on the signal track.

As is obvious from such figures, the spot shape of the main beam M formed by irradiation on the four-divided sensor portion 10a is in a circular shape close to a perfect circle, since the coma aberration generated at the half mirror 4 is corrected by the AS plate 9. If the spot shape of the main beam M is in the circular shaped beam as mentioned above, a well-balanced push-pull signal can be obtained, and therefore, the tracking control operation can be performed accurately.

In the optical pickup apparatus shown in FIG. 6, there can be considered elimination of the AS plate 9 for cost reduction. If the AS plate 9 is eliminated, an astigmatism enlargement operation can not be performed, and therefore, the focus error signal generation operation is affected. However, it was confirmed that the focusing control operation can be carried out without trouble by devising a detection circuit.

On the other hand, if the AS plate 9 is eliminated, the coma aberration generated at the half mirror 4 can not be corrected, and therefore, the spot shape of the main beam M generated by irradiation on the four-divided sensor portion 10a becomes a deformed circular shape as shown in FIG. 4. If such deformed circular spot shape of the main beam is formed by irradiation on the four-divided sensor portion 10a, the push-pull signal which is a signal output in the track direction becomes unbalanced, and therefore, an tracking error signal generation operation can not accurately be performed, which causes a problem that the tracking control operation can not accurately be carried out, so that costs could not be reduced.

SUMMARY OF THE INVENTION

An optical pickup apparatus according to an aspect of the present invention, comprises: an objective lens configured to focus laser light emitted from a laser diode to a signal recording layer of an optical disc; a photodetector including a substantially square light receiving region made of first to fourth sensors divided by a boundary in a first direction corresponding to a tracking direction and by a boundary in a second direction crossing the first direction, the light receiving region being configured to be irradiated with reflected light of the laser light which is reflected from the signal recording layer of the optical disc; and a half mirror configured to reflect the laser light in a direction of the objective lens and allow the reflected light to pass therethrough in a direction of the photodetector, the boundary in the second direction by which the first to fourth sensors in the light receiving region are divided being set according to a shape of a spot of the reflected light directly applied from the half mirror to the light receiving region.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

At least the following details will become apparent from descriptions of this specification and of the accompanying drawings.

The optical pickup apparatus according to an embodiment of the present invention is characterized in that there is included a half mirror: on which laser light emitted from a laser diode is incident; which reflects the laser light in a direction of an objective lens for focusing the laser light on a signal recording layer provided in an optical disc; and which allows return light reflected from the signal recording layer in a direction of a photodetector, and that a boundary in a tracking direction for dividing a sensor portion provided for the photodetector is set according to a spot shape of the applied return light.

According to an embodiment of the present invention, a well-balanced push-pull signal can be obtained from the sensor portion. Therefore, even if an AS plate, etc. for correcting coma aberration generated from the half mirror is eliminated, a tracking control operation using the push-pull signal can accurately be performed, and costs of the optical pickup apparatus can be reduced.

Figure 1:
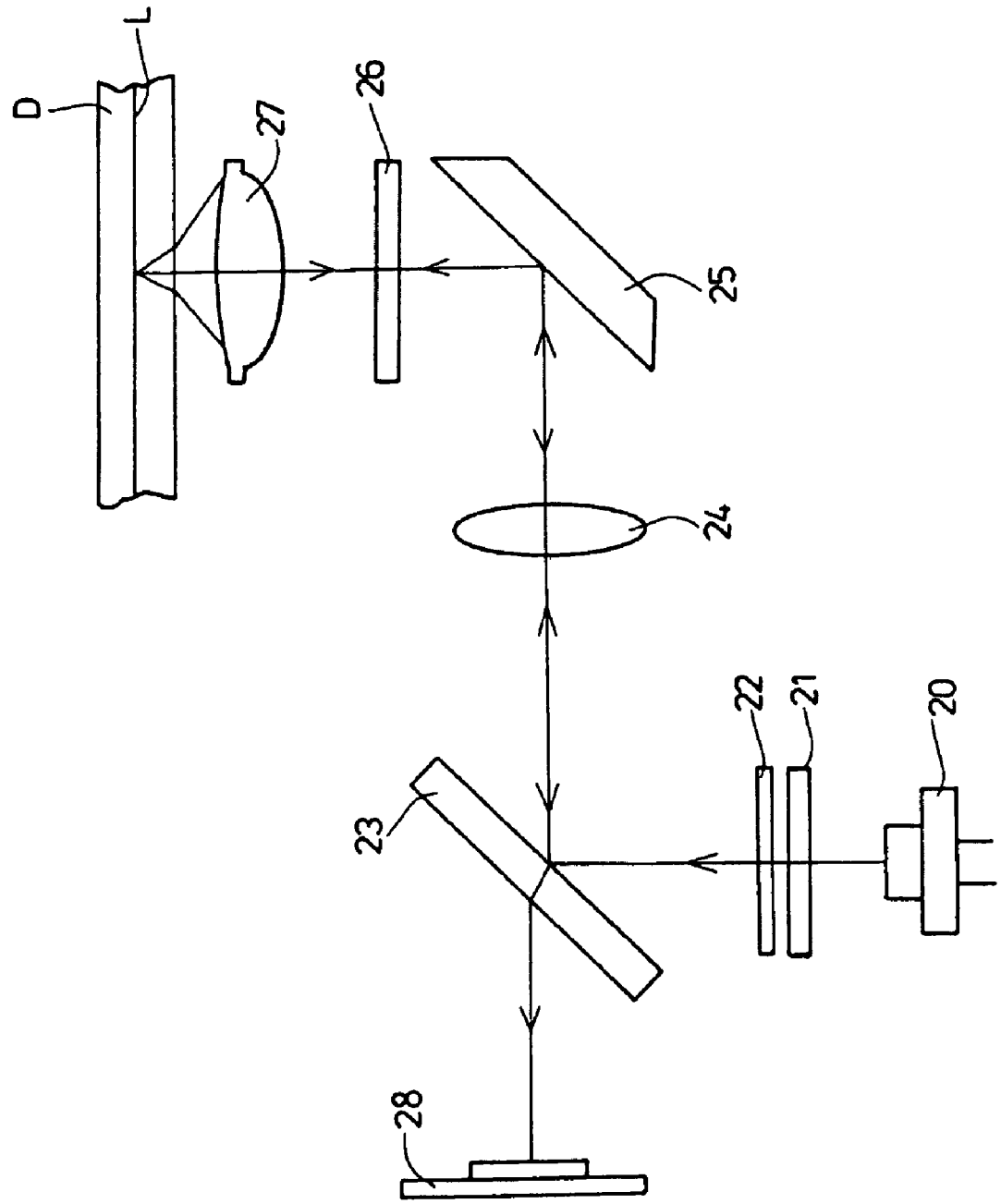
FIG. 1 is a schematic diagram illustrating an optical system making up an optical pickup apparatus according to an embodiment of the present invention.
Figure 2:
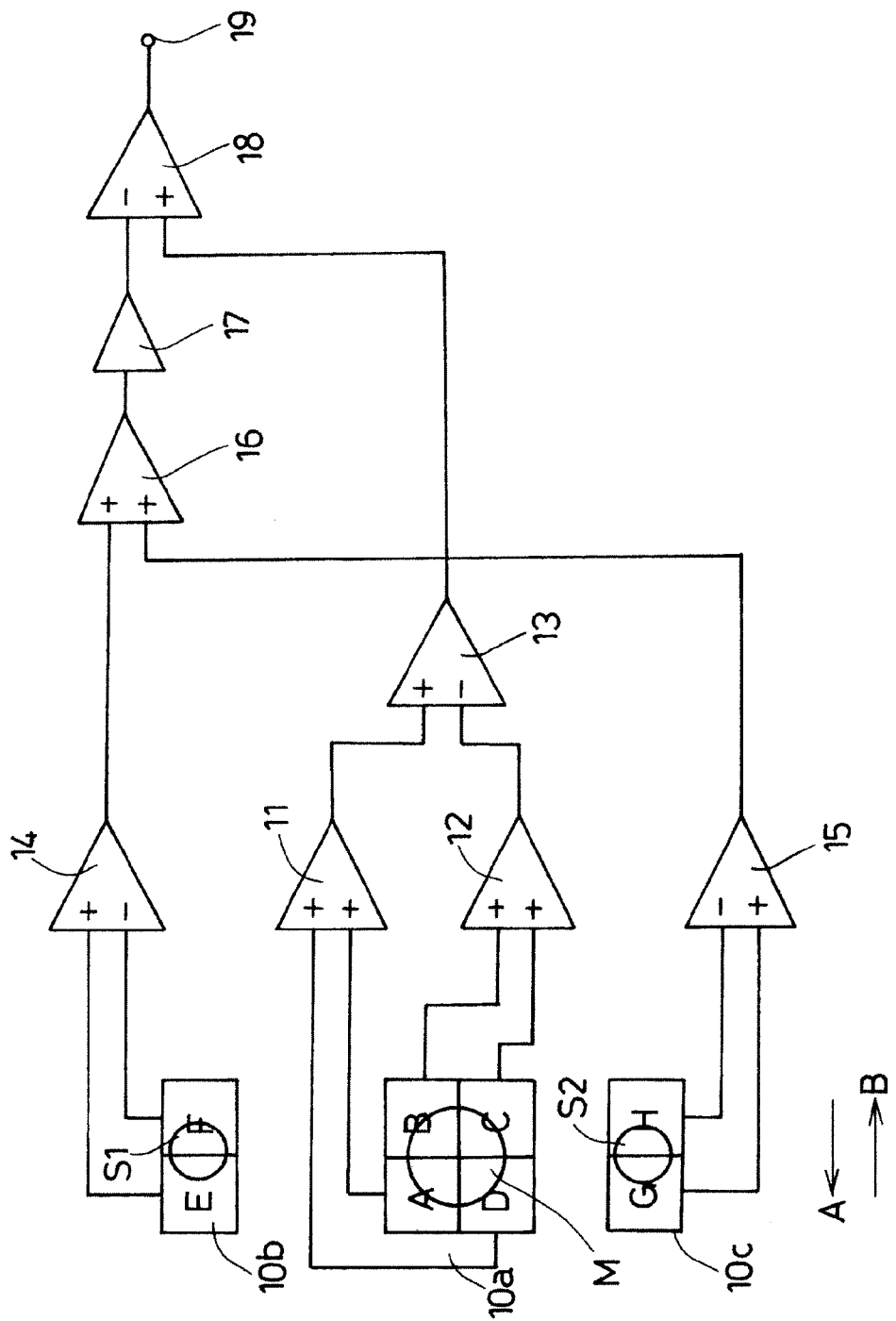
FIG. 2 is a block diagram of a circuit for generating a tracking error signal.

In FIG. 1, reference numeral 20 denotes a laser diode emitting laser light which is red light with a wavelength of 650 nm, reference numeral 21 denotes a diffraction grating that is provided at a position where the laser light emitted from the laser diode 20 is incident, and that splits the laser beam to generate a main beam which is 0th order diffracted light and sub beams which are ±1st order diffracted lights. Reference numeral 22 denotes a half-wave plate that the laser light having passed through the diffraction grating 21 enters, and that adjusts a polarization direction of the laser light emitted from the laser diode 20 to an S-direction or P-direction of linear polarization light.

Reference numeral 23 is a half mirror that is provided at a position where the laser light having passed through the diffraction grating 21 and the half-wave plate 22 is incident on, and that has a control film formed thereon which reflects the laser light in a direction of an optical disc D and which allows return light reflected from a signal recording layer L of the optical disc D to pass therethough. Reference numeral 24 denotes a collimating lens that is provided at a position where the laser light reflected at the half mirror 23 is incident, and that converts the incident laser light into parallel light.

Reference numeral 25 is a raising mirror that the laser light having been converted into the parallel light by the collimating lens 24 is incident on, and that reflects the laser light to change an optical axis in a perpendicular direction. Reference numeral 26 is a quarter-wave plate that is provided at a position where the laser light reflected by the raising mirror 25 enters, and that polarizes the laser light incident from the side of the raising mirror 25 from the linear polarization light into circular polarization light and the return light which is laser light incident from the opposite side from the circular polarization light into the linear polarization light.

Reference numeral 27 is an objective lens that is provided at a position where the laser light having passed through the quarter-wave plate 26 is applied and that generates a spot in a shape suitable for the reproduction operation performed by focusing the laser light on the signal recording layer L provided in the optical disc D. The laser light focused on the signal recording layer L provided in the optical disc D by the objective lens 27 is reflected by the signal recording layer L to enter the objective lens 27 from the side of the optical disc D as the return light (reflected light).

The return light entering the objective lens 27 passes through the objective lens 27, and then enters the quarter-wave plate 26 to be converted by the quarter-wave plate 26 from the circular polarization light into the linear polarization light. The return light having been polarized as above is reflected by the raising mirror 25, and then enters the collimating lens 24.

The return light entering the collimating lens 24 passes through the collimating lens 24 to enter the half mirror 23. The laser light and the return light are reversed with each other in a polarization direction of the linear polarization light by a reciprocal transmission operation, which is an operation that the laser light passes through the quarter-wave plate 26 onward and the return light passes therethrough backward, and therefore, the return light entering the half mirror 23 as above is not reflected by the control film provided for the half mirror 23 but passes through the control film.

Reference numeral 28 is a photodetector that is provided at a position where the return light having passed through the half mirror 23 is directly applied, and that is made up so as to generate a focus error signal and a tracking error signal by using a change in the spot shape formed by irradiation. As is obvious from the figure, in an optical pickup apparatus according to an embodiment of the present invention, an AS plate for enlarging astigmatism of the return light having passed through the half mirror 23 or for correcting the coma aberration generated by the half mirror 23 is eliminated.

The photodetector 28 includes a light receiving region to be directly irradiated with the return light having passed through the half mirror 23. This light receiving region is in a substantially square shape and is a four-divided sensor portion 28a divided into four parts in a first direction (a lateral direction on paper in FIG. 3) corresponding to the tracking direction and a second direction (a longitudinal direction on paper in FIG. 3) crossing the first direction.

Figure 3:
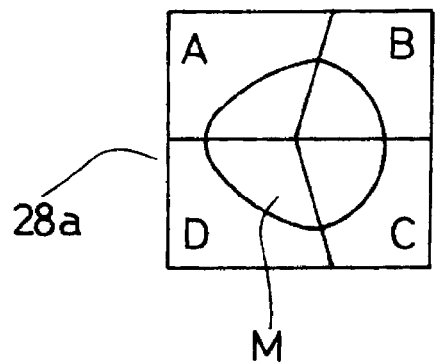
FIG. 3 is a plan view illustrating an example of a photodetector of an optical pickup apparatus according to an embodiment of the present invention.
Figure 4:
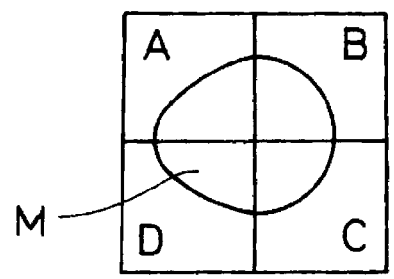
FIG. 4 is a plan view for explaining a relation between a photodetector and a spot.
Figure 5:
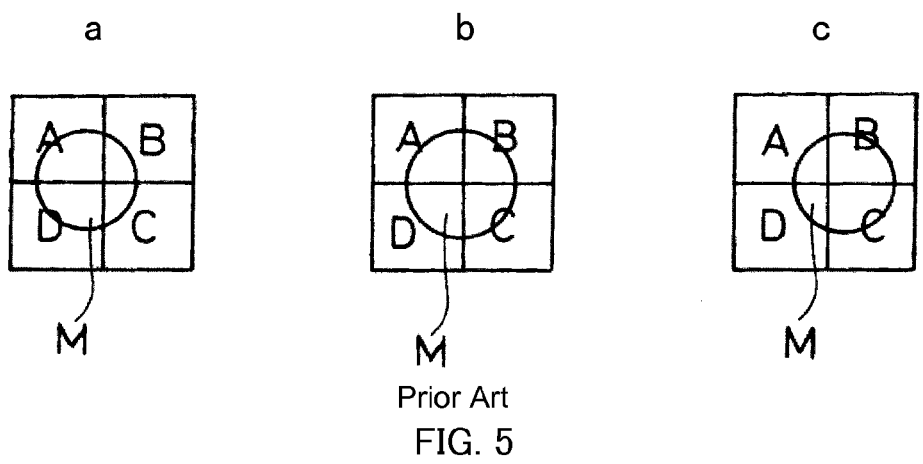
FIG. 5 is a plan view for explaining a relation between a photodetector and a spot.
Figure 6:
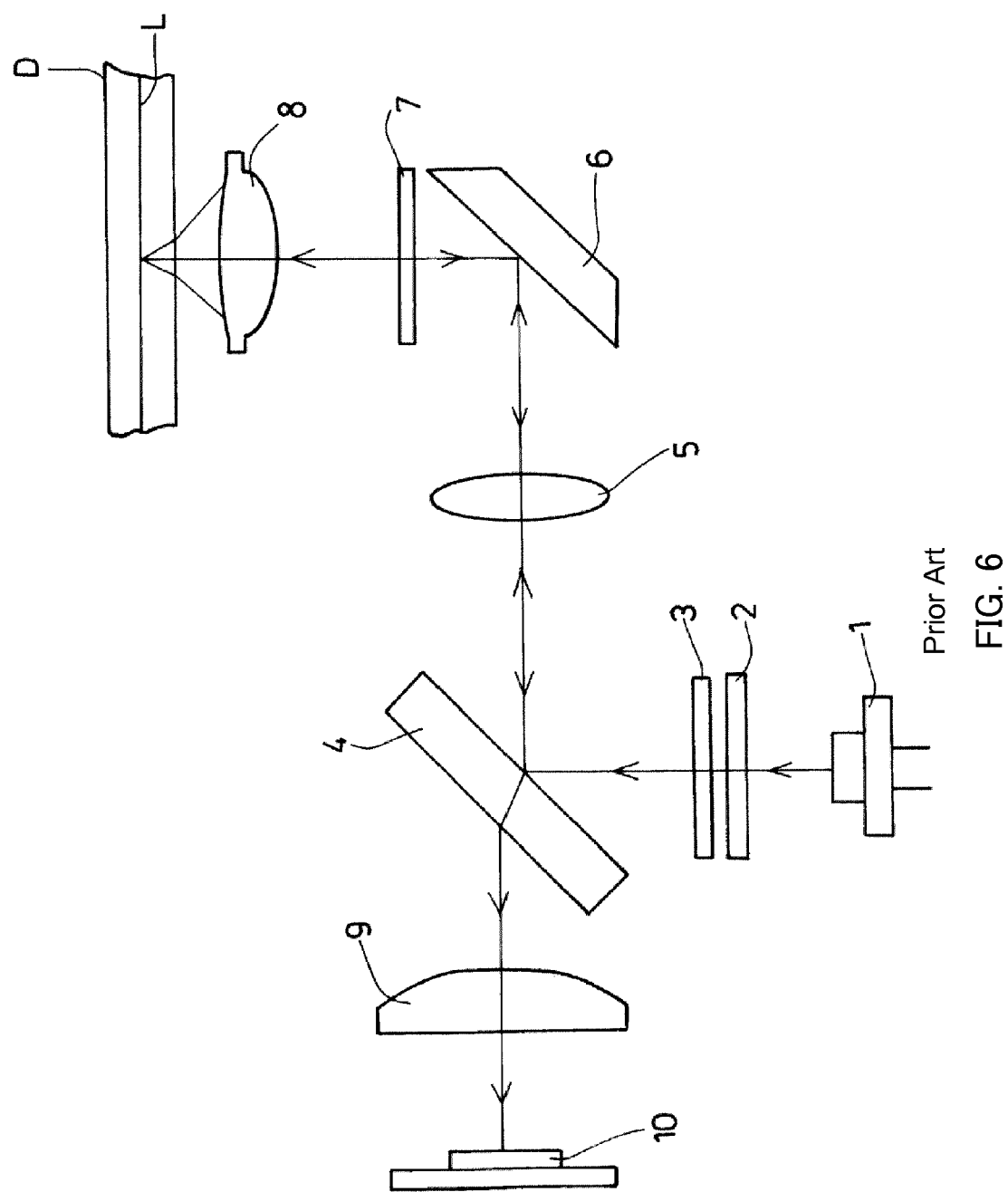
FIG. 6 is a schematic diagram illustrating an optical system making up an optical pickup apparatus.

The spot shape of a reflected light applied to the four-divided sensor portion 28a is, as shown in FIG. 3, a deformed circular shape when the spot of the laser light is positioned on a track of the signal recording layer of the optical disc. Specifically, the spot shape of the reflected light applied to the four-divided sensor portion 28a is a shape in which the left side on paper in FIG. 3 is narrower. This is because coma occurs in the laser light passing through the half mirror 23 since the half mirror 23 is made up of a plane parallel plate, which is disposed in an inclined position relative to the optical axis of the laser light so that astigmatism for focusing control is generated in the return light by the half mirror 23.

FIG. 3 shows a division shape of the four-divided sensor portion 28a included in the photodetector 28 of the optical pickup apparatus according to an embodiment of the present invention and the sensor portion is made up so as to be divided according to the spot shape of the main beam M, which is a deformed circular shape. That is, the four-divided sensor portion 28a is divided by boundaries such that: a first electric signal, which is obtained by adding a photoelectrically converted electric signal obtained from a sensor A (first sensor) and the photoelectrically converted electric signal obtained from a sensor D (fourth sensor), is equal to a second electric signal, which is obtained by adding the photoelectrically converted electric signal obtained from a sensor B (second sensor) and the photoelectrically converted electric signal obtained from a sensor C (third sensor), according to the spot shape formed by the return light applied to the four-divided sensor portion 28a, when the spot of the laser light is positioned on the track of the signal recording layer of the optical disc. Even if the spot shape formed by the return light having passed through the half mirror 23 becomes a deformed circular shape caused by the coma aberration, by setting the boundaries of the four-divided sensor portion 28a as above, there can be obtained a well-balanced signal as the push-pull signal for obtaining the tracking error signal.

Therefore, according to an embodiment of the present invention, even if the spot shape formed by the return light applied to the photodetector 28 becomes deformed by eliminating the AS plate provided for correcting the coma aberration generated from the half mirror 23, an accurate tracking error signal generation operation can be performed.

When the spot of the laser light is positioned on the track of the signal recording layer of the optical disc, division is made such that the first electric signal, which is obtained by adding the electric signal obtained from the sensor A and the electric signal obtained from the sensor D, is equal to the second electric signal, which is obtained by adding the electric signal obtained from the sensor B to the electric signal obtained from the sensor C, wherein the sensors A, B, C, and D make up the four-divided sensor portion. On such condition as above, when division is made furtherer such that a third electric signal, which is obtained by adding the electric signal obtained from the sensor A to the electric signal obtained from the sensor C, is equal to a fourth electric signal, which is obtained by adding the electric signal from the sensor B to the electric signal obtained from the sensor D, focus error signal generation based on the focusing control by an astigmatic method can be accurately be performed with the use of the main beam M to which astigmatism is added by the half mirror 23. Therefore, the focusing control operation can be also carried out without trouble.

If the four-divided sensor portion 28a is divided as above, a light receiving area of the sensor A becomes larger than the light receiving area of the sensor B. That is, the sensors A and B are divided by a boundary (dividing position) inclined toward the sensor B as it goes upward from the center of the four-divided sensor portion 28a as shown in FIG. 3. Also, the light receiving area of the sensor D becomes larger than the light receiving area of the sensor C. That is, the sensors C and D are divided by a boundary (dividing position) inclined toward the sensor C as it goes downward from the center of the four-divided sensor portion 28a as shown in FIG. 3.

In an embodiment of the present invention, there is described such a case where the AS plate is eliminated which is an optical component for correcting the coma aberration generated in the return light passing through the half mirror, and an embodiment of the present invention can also be applied to a case where an optical component called sensor lens is eliminated.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
    an objective lens configured to focus laser light emitted from a laser diode to a signal recording layer of an optical disc;
    a photodetector including a substantially square light receiving region made of first to fourth sensors divided by a boundary in a first direction corresponding to a tracking direction and by a boundary in a second direction crossing the first direction, the light receiving region configured to be irradiated with reflected light of the laser light which is reflected from the signal recording layer of the optical disc; and
    a half mirror configured to reflect the laser light in a direction of the objective lens and to allow the reflected light to pass through in a direction of the photodetector,
    wherein the boundary in the second direction by which the first to fourth sensors in the light receiving region are divided set according to a shape of a spot of the reflected light directly applied from the half mirror to the light receiving region when a spot of the laser light is positioned on a track of the signal recording layer of the optical disc, the shape resulting from coma aberration caused by the half mirror, and
    wherein the first and second sensors, and the third and fourth sensors are divided by the boundary in the first direction, the first and fourth sensors, and the second and third sensors are divided by the boundary in the second direction, and light receiving areas of the first and fourth sensors are larger than the light receiving areas of the second and third sensors, respectively.

2. The optical pickup apparatus according to claim 1, wherein
    the first to fourth sensors are divided such that when a spot of the laser light is positioned on a track of the signal recording layer, a first electric signal, which is obtained as a result of photoelectric conversion of the reflected light applied to the first and fourth sensors, is equal to a second electric signal, which is obtained as a result of photoelectric conversion of the reflected light applied to the second and third sensors, and wherein
    the first and second electric signals are signals for generating a tracking error signal of the optical disc.

3. The optical pickup apparatus according to claim 2, wherein
    the first to fourth sensors are divided such that when the spot of the laser light is positioned on the track of the signal recording layer, a third electric signal, which is obtained as a result of photoelectric conversion of the reflected light applied to the first and third sensors, is equal to a fourth electric signal, which is obtained as a result of photoelectric conversion of the reflected light applied to the second and fourth sensors, and wherein
    the third and fourth electric signals are signals for generating a focus error signal of the optical disc.

* * * * *